US011055056B1

(12) United States Patent
Trail

(10) Patent No.: US 11,055,056 B1
(45) Date of Patent: Jul. 6, 2021

(54) SPLIT SYSTEM FOR ARTIFICIAL REALITY

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 53 days.

(21) Appl. No.: 16/252,747

(22) Filed: Jan. 21, 2019

Related U.S. Application Data

(60) Provisional application No. 62/736,439, filed on Sep. 25, 2018.

(51) Int. Cl.
*G06F 3/147* (2006.01)
*G06T 19/00* (2011.01)
*G06T 7/70* (2017.01)
*G02B 27/01* (2006.01)
*G06F 1/16* (2006.01)

(52) U.S. Cl.
CPC ........ *G06F 3/147* (2013.01); *G02B 27/0172* (2013.01); *G06F 1/163* (2013.01); *G06T 7/70* (2017.01); *G06T 19/006* (2013.01); *G02B 2027/014* (2013.01); *G02B 2027/0138* (2013.01); *G06T 2207/10028* (2013.01)

(58) Field of Classification Search
CPC ....... G06F 3/147; G06F 1/163; G06T 19/006; G06T 7/70; G06T 2207/10028; G02B 27/0172; G02B 2027/014; G02B 2027/0138
See application file for complete search history.

(56) References Cited

U.S. PATENT DOCUMENTS 5,977,935 A * 11/1999 Yasukawa ............ G02B 27/017
340/980
8,203,502 B1 6/2012 Chi et al.
(Continued)

OTHER PUBLICATIONS

Marvin, Rob, "Snapchat Spectacles: Everything You Need to Know", URL: https://www.pcmag.com/article/350013/snapchat-spectacles-everything-you-need-to-know, Feb. 21, 2017, 12 pages.
(Continued)

*Primary Examiner* — Grant Sitta
(74) *Attorney, Agent, or Firm* — FisherBroyles, LLP

(57) ABSTRACT

The disclosed system may include (1) a wearable display device including (a) a display subsystem that presents an image, and (b) a first wireless interface that receives image data, where the display subsystem bases the image on the image data, and (2) a processing device that is physically separate from the display device and includes (a) a display data processing subsystem that generates the image data, (b) a second wireless interface that transmits the image data directly to the first wireless interface, and (3) a position detection subsystem including a sensor that captures depth data in a local environment of the display device, where the position detection subsystem determines a location or an orientation of a portion of a user within the local environment, and the display data processing subsystem generates the image data based on the location or orientation. Various other systems and methods are also disclosed.

20 Claims, 15 Drawing Sheets

(56) References Cited

U.S. PATENT DOCUMENTS

| | | | | |
|---|---|---|---|---|
| 8,948,935 | B1* | 2/2015 | Peeters | B64D 1/22 |
| | | | | 701/3 |
| 9,558,557 | B2* | 1/2017 | Jiang | G06T 7/74 |
| 10,534,203 | B2* | 1/2020 | Olgun | H04B 5/0075 |
| 2007/0281752 | A1* | 12/2007 | Lewis | G02C 11/10 |
| | | | | 455/569.1 |
| 2008/0090622 | A1* | 4/2008 | Kim | H04M 1/05 |
| | | | | 455/573 |
| 2008/0143678 | A1* | 6/2008 | Sadler | G02B 27/017 |
| | | | | 345/168 |
| 2009/0146609 | A1 | 6/2009 | Santos | |
| 2010/0320961 | A1* | 12/2010 | Castillo | H02J 7/0044 |
| | | | | 320/107 |
| 2011/0222154 | A1* | 9/2011 | Choi | H04N 13/332 |
| | | | | 359/464 |
| 2012/0062173 | A1* | 3/2012 | Choi | H02J 50/80 |
| | | | | 320/108 |
| 2014/0314170 | A1 | 10/2014 | Plumb et al. | |
| 2015/0153825 | A1* | 6/2015 | Lee | G02B 27/0172 |
| | | | | 345/8 |
| 2015/0243078 | A1* | 8/2015 | Watson | A63F 13/86 |
| | | | | 345/547 |
| 2015/0245127 | A1 | 8/2015 | Shaffer | |
| 2016/0094077 | A1* | 3/2016 | Kim | H02J 7/0044 |
| | | | | 320/108 |
| 2016/0104451 | A1 | 4/2016 | Sahin | |
| 2016/0126779 | A1* | 5/2016 | Park | H02J 50/80 |
| | | | | 320/108 |
| 2017/0045941 | A1* | 2/2017 | Tokubo | A63F 13/53 |
| 2017/0083115 | A1* | 3/2017 | Speck | G06F 3/0346 |
| 2017/0097753 | A1* | 4/2017 | Bailey | G06F 3/013 |
| 2017/0133889 | A1* | 5/2017 | Yeo | H02J 7/00712 |
| 2017/0163076 | A1 | 6/2017 | Park et al. | |
| 2017/0297438 | A1 | 10/2017 | Park et al. | |
| 2017/0353821 | A1 | 12/2017 | Evans et al. | |
| 2018/0064224 | A1 | 3/2018 | Brzezinski et al. | |
| 2018/0165885 | A1* | 6/2018 | Rodriguez, II | G06T 19/006 |
| 2018/0224936 | A1* | 8/2018 | Tumey | G06F 3/015 |
| 2018/0272231 | A1* | 9/2018 | Katoh | G06T 19/00 |
| 2019/0027113 | A1* | 1/2019 | Kaine | G09G 5/005 |
| 2019/0033622 | A1 | 1/2019 | Olgun et al. | |
| 2019/0109482 | A1 | 4/2019 | Park et al. | |
| 2019/0173294 | A1* | 6/2019 | Paulson | H02J 7/025 |
| 2019/0200113 | A1* | 6/2019 | Kim | H04R 1/1025 |
| 2019/0253692 | A1* | 8/2019 | El-Imad | H04N 13/161 |
| 2019/0272800 | A1* | 9/2019 | Tao | A45C 11/04 |
| 2019/0318589 | A1* | 10/2019 | Howell | G08B 21/0446 |
| 2019/0331914 | A1* | 10/2019 | Lee | G06F 3/0304 |
| 2020/0021138 | A1 | 1/2020 | Yeo et al. | |
| 2020/0034995 | A1* | 1/2020 | Joshi | H04W 4/20 |
| 2020/0096774 | A1* | 3/2020 | Trail | G02B 27/0176 |

OTHER PUBLICATIONS

Apple Inc., "Airpods—Technical Specifications", URL: https://support.apple.com/kb/SP750?locale=en_US, Mar. 19, 2018, 3 pages.

Wikipedia, "Qi (standard)", URL: https://en.wikipedia.org/wiki/Qi_standard), Dec. 26, 2018, 5 pages.

U.S. Appl. No. 16/252,745, "Multiple-Device System With Multiple Power and Data Configurations" of Trail, Nicholas Daniel, filed Jan. 21, 2019, 70 pages.

Non-Final Office Action received for U.S. Appl. No. 16/252,745 dated Jan. 24, 2020, 39 pages.

* cited by examiner

Configuration 300

Configuration 400

Configuration 500

Configuration 600

Configuration 700

SPLIT SYSTEM FOR ARTIFICIAL REALITY

CROSS REFERENCE TO RELATED APPLICATION

This application claims the benefit of U.S. Provisional Application No. 62/736,439, filed 25 Sep. 2018, the disclosure of which is incorporated, in its entirety, by this reference.

BACKGROUND

Some portable electronic systems may be designed to be operated while worn or carried by a user. For example, virtual reality (VR) systems, augmented reality (AR) systems, mixed reality (MR) systems, and other artificial reality systems that present an artificial reality to the user are typically fashioned as a head-mounted device (HMD) intended to be worn by the user as the user performs various movements and actions. In at least some examples, such movements may include walking, jumping, dancing, and so on. Moreover, the system may modify the presented artificial reality based on those movements, as detected by the system, to enhance the realism of the experience of the user.

Typically, presenting such an artificial reality involves a significant amount of electronics, including one or more sensors to detect the user movements and one or more processors to determine the effect of those movements on the artificial reality being presented to the user. Further, in many cases, the electronics may add undesirable weight or bulk to the HMD, which may adversely affect the user's movements and overall level of satisfaction with the system.

SUMMARY

As will be described in greater detail below, the instant disclosure describes various portable electronic systems as multiple devices that may be communicatively coupled by wire or wirelessly. Consequently, in some examples, the overall weight and volume associated with the system may be distributed among those devices, thus allowing the size or weight of at least one of those devices, such as an HMD or other headwear associated with an artificial reality system, to be reduced, thus possibly enhancing the user's experience in using the system. In some embodiments, the various devices may be configured in several ways, thus providing flexibility in how the system is used.

In one example, an artificial reality system may include (1) a wearable display device to be worn by a user while the artificial reality system is in an operational configuration, the wearable display device including (a) a display subsystem that presents an image to the user; and (b) a first wireless communication interface that receives image data, where the display subsystem bases the image on the image data, and (2) a processing device that is physically separate from the wearable display device in the operational configuration, where the processing device include (a) a display data processing subsystem that generates the image data, (b) a second wireless communication interface that transmits the image data directly to the first wireless communication interface of the wearable display device, and (c) a position detection subsystem comprising at least one sensor, where the at least one sensor captures depth data in a local environment of the wearable display device, the position detection subsystem determines at least one of a location or an orientation of at least a portion of the user within the local environment, and the display data processing subsystem generates the image data based at least in part on the at least one of the location or the orientation of the portion of the user within the local environment. In some embodiments, the at least one sensor may include at least one camera. Also, in some examples, the portion of the user may include at least one of a head, a face, hands, arms, or legs of the user.

In some embodiments, the position detection subsystem may generate a map of the local environment based on the depth data, and the display data processing subsystem may generate the image data based at least in part on the map of the local environment. Moreover, in some examples, the display data processing subsystem may generate the image data based at least in part on the map of the local environment by generating an artificial environment represented in at least a portion of the image data.

In some examples, the second wireless communication interface may transmit the at least one of the location or the orientation of the portion of the user within the local environment to a second artificial reality system.

The display data processing subsystem, in some embodiments, may generate a three-dimensional model of the user based on the at least one of the location or the orientation of the portion of the user within the local environment. Additionally, in some examples, the display data processing subsystem may generate the image data based at least in part on the three-dimensional model. Moreover, in some embodiments, the second wireless communication interface may transmit the three-dimensional model to a second artificial reality system.

In some embodiments, the second wireless communication interface may receive at least one of a location or an orientation of at least a portion of a user of a second artificial reality system in relation to a local environment of the second artificial reality system, and the image data is based at least in part on the location or the orientation of the user of the second artificial reality system.

In some examples, the processing device may include at least one light-emitting component, the wearable display device may include at least one sensor that detects light from the at least one light-emitting component, the first wireless communication interface may transmit data indicating the light detected by the at least one sensor to the second wireless communication interface of the processing device, the position detection subsystem may determine a location of the at least one light-emitting component within the local environment based on the data; and the display data processing subsystem may generate the image data based at least in part on the location of the at least one light-emitting component within the local environment. In some embodiments, the display data processing subsystem, in generating the image data, may interpret the location of the at least one light-emitting component as a location of the processing device being employed as a user input device.

In some embodiments, the wearable display device may include (1) a first battery that supplies power to operate the wearable display device and (2) a first power interface that receives power to charge the first battery, the processing device may include (1) a second battery that supplies power to operate the processing device, and (2) a second power interface that transmits power from the second battery to the first power interface of the wearable display device to charge the first battery while the artificial reality system is in a charging configuration. In some examples, an energy storage capacity of the second battery may be greater than an energy storage capacity of the first battery. Also, in some embodiments, the first power interface and the second power interface may be wireless power interfaces that are inductively coupled to each other while the artificial reality system is in the charging configuration in which the wearable display device resides atop the processing device.

In some examples, the processing device may include an input interface that generates input data in response to an action by the user, and the display data processing subsystem may generate the image data based at least in part on the input data. Moreover, in some examples, the input interface may include at least one of a click interface and a touch interface.

In one example, a wearable device for an artificial reality system may include (1) a display subsystem that presents an image to a user while the artificial reality system is in an operational configuration, (2) a wireless communication interface that receives image data from a processing device that is physically separate from the wearable display device while the artificial reality system is in the operational configuration, wherein the display subsystem bases the image on the image data, (3) a battery for supplying power to the wearable display device, and (4) a wireless power interface that receives power by way of inductive coupling with the processing device to charge the battery while the artificial reality system is in a charging configuration in which the wearable display device resides atop the processing device.

In one example, a processing device for an artificial reality system may include (1) a display data processing subsystem that generates image data, (2) a wireless communication interface that transmits the image data directly to a wearable display device that is physically separate from the wearable display device while the artificial reality system is in an operational configuration, and (3) a position detection subsystem comprising at least one sensor, where the at least one sensor captures depth data in a local environment of the wearable display device, the position detection subsystem determines at least one of a location or an orientation of at least a portion of a user of the artificial reality system within the local environment, and the display data processing subsystem generates the image data based at least in part on the at least one of the location or the orientation of the portion of the user within the local environment. In some embodiments, the processing device may also include (1) a battery for supplying power to the processing device, and (2) a wireless power interface that provides power to charge a battery of the wearable display device while the artificial reality system is in a charging configuration in which the wearable display device resides atop the processing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
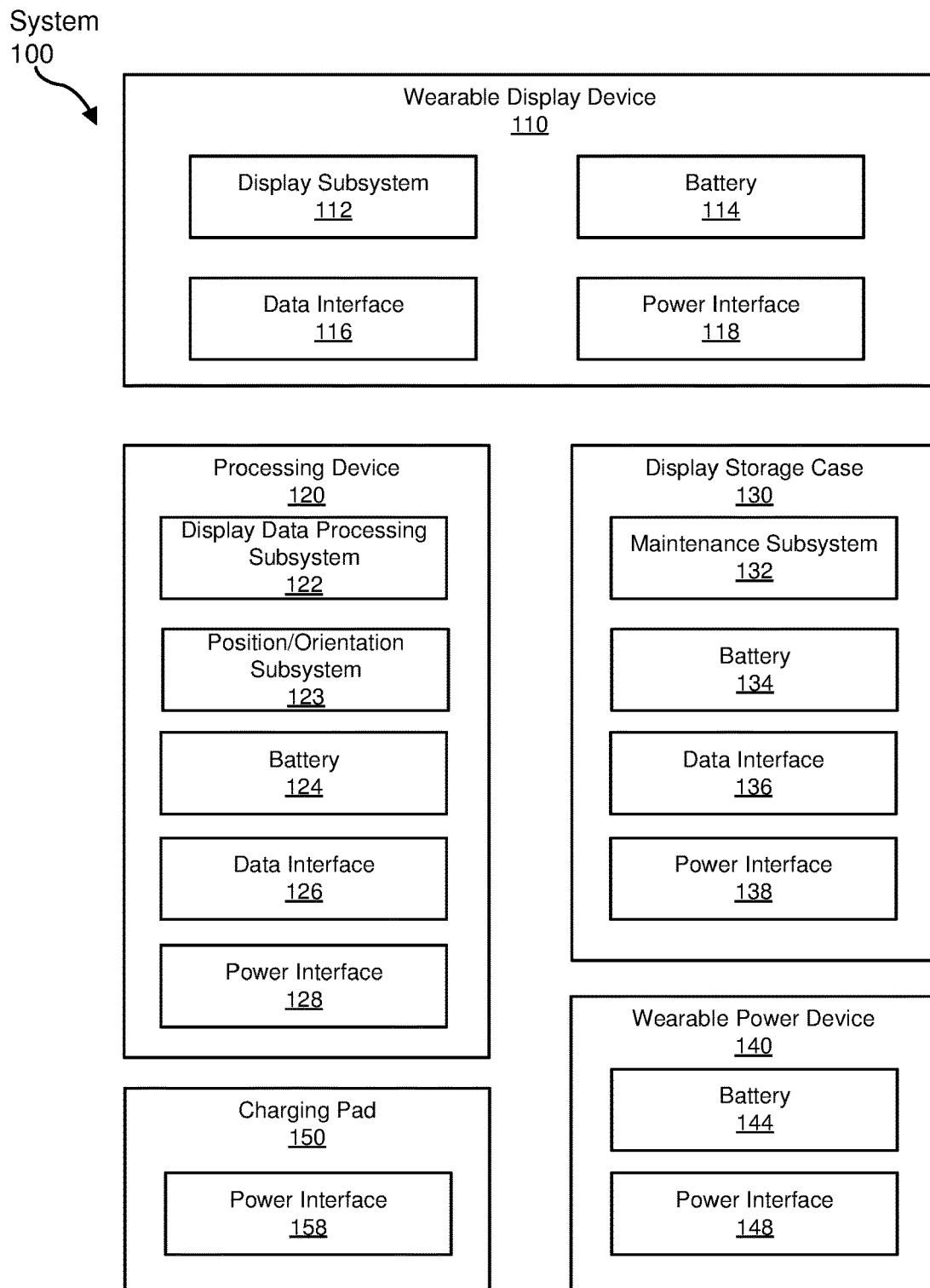
FIG. 1 is block diagram of multiple exemplary electronic devices of an electronic system that includes a wearable display device.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to multi-device systems with multiple power and data configurations. As will be explained in greater detail below, embodiments of the instant disclosure may facilitate a relatively small size and/or weight for one or more of the devices, possibly allowing for greater usability associated with the intended use of the system. Additionally, in some examples, the use of multiple devices may allow multiple options regarding how the system is configured for normal operation, energy storage, and/or ongoing maintenance of the system.

The following will provide, with reference to FIGS. 1-15, detailed descriptions of multi-device electronic systems. An exemplary system employing multiple devices is described in conjunction with FIG. 1. Several possible exemplary configurations of the devices, such as for normal operations, energy storage (e.g., battery charging), system maintenance, and so on, are discussed in connection with FIGS. 2-10. An exemplary near-eye display (NED) employable as one of the devices of the system of FIG. 1 is briefly described in association with FIG. 11, and the system of FIG. 1, including the NED of FIG. 11, employed within a local environment, is discussed in conjunction with FIG. 12. Several exemplary artificial reality systems that may incorporate multiple devices are described in conjunction with FIGS. 13-15.

In various embodiments discussed below, an artificial reality system is employed as an example of a multi-device electronic system. However, other types of systems in which portability of at least one of the devices in such a system is of some importance (e.g., a device carried by aircraft, a device that must reside within a small space, and so on) may benefit from one or more aspects of the various embodiments described herein.

FIG. 1 is a block diagram of a system 100 including multiple electronic devices. In this particular example, system 100 may include two or more of a wearable display device 110, a processing device 120, a display storage case 130, a wearable power device 140, and/or a charging pad 150. In some examples, system 100 may operate as an artificial reality system. Other embodiments of system 100 may include greater or fewer numbers of such devices. Further, while FIG. 1 indicates that each device includes particular subsystems or components, one or more of the devices may include other combinations of subsystems or components not specifically discussed herein while remaining within the scope of the embodiments presented. An example of system 100 within a particular local environment is discussed below in connection with FIG. 12.

Wearable display device 110, as depicted in FIG. 1, may include a display subsystem 112, a battery 114, a data interface 116, and a power interface 118. In some embodiments, wearable display device 110 may be an HMD, an NED, or some other display device worn by a user of system 100. An example NED employable as wearable display device 110 is briefly described below in conjunction with FIG. 11.

Display subsystem 112 of wearable display device 110 may include one or more visual display components (e.g., display screens, projectors, and/or optical waveguides, possibly along with one or more optical elements, such as lenses, mirrors, and the like), along with one or more audio presentation components (e.g., one or more speakers, headphones, or the like.) To facilitate portable or mobile operation, wearable display device 110 may also include battery 114 for storing electrical charge to power the operation of wearable display device 110.

Data interface 116 of wearable display device 110 may receive display data (e.g., video and/or audio data) from processing device 120, described in greater detail below. In some examples, data interface 116 may be a wireless data interface (e.g., a 60 gigahertz (GHz) wireless interface) or wired data interface that receives display data from processing device 120. In other embodiments, data interface 116 may receive and/or send other types of data between wearable display device 110 and processing device 120. Power interface 118 of wearable display device 110 may be a wired or wireless (e.g., inductive coupling) interface that receives energy (e.g., from one or more of processing device 120, display storage case 130, wearable power device 140, or charging pad 150) for charging battery 114 and/or for providing power directly to operate wearable display device 110. In some examples, battery 114 may be a relatively small capacity battery (e.g., a 0.5 watt-hour battery) to limit the total weight or bulk of wearable display device 110.

Processing device 120, as illustrated in FIG. 1, may include a display data processing subsystem 122, a position/orientation subsystem 123, a battery 124, a data interface 126, and a power interface 128. In some examples, processing device 120 may resemble a smart phone (e.g., a relatively thin rectangular device that may be handheld), although processing device 120 is not limited to such an appearance. Also, in some examples, processing device 120 may be designed for use while remaining in a stationary position, such as resting on a table near the user.

In some embodiments, processing device 120 may include a user input interface (e.g., a touch interface or a more tactile (e.g., "clicky") interface that includes static button areas, or input areas that may be programmable. In various examples, processing device 120 may or may not include a display device, as the user may use wearable display device 110 for such functionality.

In some embodiments, display data processing subsystem 122 (or, more simply, processing subsystem 122) may generate display (e.g., audio and/or video) data for transmission via data interface 126 and data interface 116 for presentation to the user by display subsystem 112 of wearable display device 110. In some examples, data interface 126 may be wired or wireless to successfully communicate with data interface 116 of wearable display device 110.

Processing subsystem 122, in some embodiments, may perform one or more complex or processing-intensive calculations or tasks associated with the generation of display data used by display subsystem 112. For example, processing subsystem 122 may generate a view of a virtual or artificial environment from the perspective of the user based on other data, such as a map of the artificial environment, a current location and/or orientation of the user's head within a physical (e.g., real-world) environment, and the like. To generate the location and/or orientation data, processing device 120 may further include position/orientation subsystem 123 to generate that data. In some examples, position/orientation subsystem 123 may include one or more cameras (e.g., color cameras, monochromatic cameras, time-of-flight (TOF) cameras, infrared (IR) cameras, or the like) or other types of sensors to detect the position/orientation data, which may include the location of the head, face, hands, arms, legs, and/or other portions of the user, as well as physical features of the real-world environment. That data may then be employed by processing subsystem 122 to generate the artificial environment from the user's perspective.

Additionally, in some examples, processing subsystem 122, via the data from position/orientation subsystem 123, may generate a three-dimensional model of the user. Moreover, in some embodiments, processing subsystem 122 may be coupled with the Internet or a separate computer system (e.g., via data interface 126) with a processing subsystem 122 of another system 100 being employed by a second user, such that models of the two users may be exchanged. Processing subsystem 122 of the first system 100 may then generate a representation of the other user for presentation to the user (e.g., via display subsystem 112) so that each user may see the other user within his own artificial environment.

In some examples, processing device 120, if handheld in nature, may be employed as a controller, pointer, or other user input device during operation of system 100. For example, processing device 120 may include trackable technology (e.g., IR light-emitting diodes (LEDs)) that may be tracked by IR cameras installed on wearable display device 110. The resulting tracking data may then be forwarded (e.g., via data interfaces 116 and 126) to processing subsystem 122 to influence the artificial environment. Other enhancements to the artificial environment being displayed to the user are also possible.

Based on the operations performed by processing device 120 in some embodiments, use of processing device 120 physically separated from wearable display device 110 may facilitate the presentation of an enhanced artificial environment by way of large system-on-a-chip (SOC) components, hardware processors, sensors, cameras, and the like without burdening wearable display device 110 with the additional bulk potentially associated with those components.

Similarly, battery 124 of processing device 120 may be larger, and thus may provide more energy storage capacity (e.g., with a capacity of 5 watt-hours), than battery 114 of wearable display device 110 to power the various electronic components of processing device 120. In some examples, battery 124 may be employed to transfer power (e.g., via wired or wireless power interface 128) to wearable display device 110, such as to operate wearable display device 110 and/or charge battery 114. In some examples, battery 124 may be charged via wired or wireless power interface 128.

Continuing with other devices of system 100, display storage case 130 may be a case (e.g., similar in appearance to an eyeglass case) into or upon which wearable display device 110 may be placed when the user is not actively operating wearable display device 110 or system 100. As depicted in FIG. 1, display storage case 130 may include one or more of a maintenance subsystem 132, a battery 134 (e.g., with a capacity of 5 watt-hours), a data interface 136, and a power interface 138. As with other devices described herein, greater or fewer components other than those specifically discussed below in conjunction with display storage case 130 may be included therein.

In some examples, display storage case 130 may be employed as a charging station for wearable display device 110, such as by way of a wired (e.g., via hardware connections) or wireless (e.g., via inductive charging) power interface 138 while wearable display device 110 is resting in display storage case 130. Further, in some examples, display storage case 130 may be supplied power or battery 134 may be charged by receiving power by way of a wired (e.g., USB® (Universal Serial Bus) or wall outlet) or wireless (e.g., inductive coupling) connection.

Also, in some embodiments, maintenance subsystem 132 may perform one or more maintenance operations (e.g., optical projector or other optical element realignment, diagnostic testing, firmware upgrading, and so on) on wearable display device 110 when wearable display device 110 resides in display storage case 130. In some examples, maintenance subsystem 132 may include a processor, one or more optical elements for testing, and/or other components. Further, one or more such maintenance operations may involve the transfer of data between display storage case 130 and wearable display device 110 (e.g., via data interfaces 116 and 136).

Wearable power device 140, as shown in FIG. 1, may include, for example, a battery 144 and a power interface 148. In some embodiments, wearable power device 140 may take the form of a necklace, lanyard, belt, or other item that may be worn by the user in conjunction with wearable display device 110 during operation of system 100. In some examples, battery 144, by way of wired or wireless power interfaces 118 and 148, may charge battery 114 of wearable display device 110 and/or directly provide power to operate wearable display device 110.

In some examples, additional components similar to display data processing subsystem 122, position/orientation subsystem 123, and/or data interface 126 of processing device 120 may be included in wearable power device 140, thus facilitating the generation of display data for use by display subsystem 112 of wearable display device 110, as well as other functions associated with those components, as described above. In such embodiments, processing-intensive tasks may be provided in a wearable device not directly impacting the head of the user, as opposed to a separate device (e.g., processing device 120) located some distance from user. Consequently, in some embodiments, a data interface within wearable power device 140 may be a wired or wireless data interface coupled with corresponding data interface 116 of wearable display device 110.

Charging pad 150, as depicted in FIG. 1, may include a wireless power interface 158 (e.g., an inductive charging interface). In some examples, wireless power interface 158, as well as other power interfaces described herein, may conform to the Qi® wireless charging standard. As indicated in the various configurations discussed below, charging pad 150 may be capable of charging multiple devices of system 100 in parallel, such as by providing a sufficiently large charging surface upon which two or more devices may rest simultaneously. In other examples, charging pad 150 may charge multiple such devices in a "stacked" manner, in which one device being charged directly by charging pad 150 may transfer some of the received electrical energy to another device of system 100, such as by way of a wired connection or a second wireless (e.g., inductively coupled) connection.

FIGS. 2-10 are block diagrams of various operating, charging, and maintenance configurations that may be formed by two or more devices 110, 120, 130, 140, and 150 of system 100. Depending on the particular embodiment of system 100 being used, greater or fewer configurations than those described below may be employed in other examples.

Figure 2:
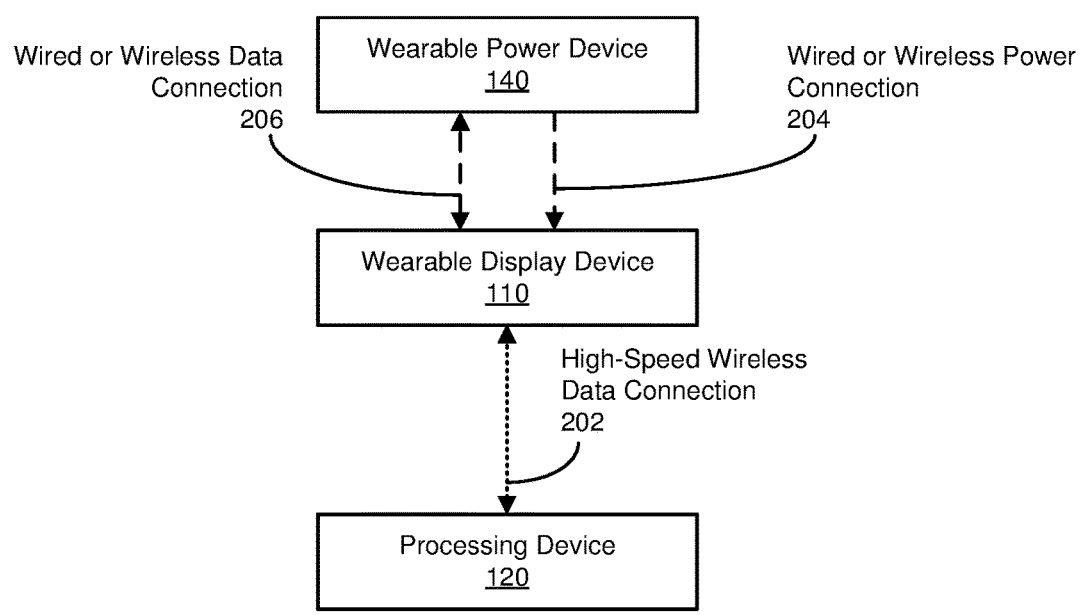
FIGS. 2-10 are block diagrams of exemplary data and power configurations for the exemplary electronic devices of FIG. 1.

FIG. 2 is a block diagram of a configuration 200 in which wearable display device 110 and processing device 120 of system 100 are operated normally, as described above, to present an artificial environment to a user (e.g., via display subsystem 112 of wearable display device 110). To perform those operations, wearable display device 110 and processing device 120 may maintain a high-speed wireless data connection 202 (e.g., using data interfaces 116 and 126), such as a 60 GHz wireless communication interface, to transfer display data generated by processing device 120 to wearable display device 110. In some embodiments, processing device 120 and wearable display device 110 may engage in a device "pairing" and/or connecting operation prior to normal operation as part of system 100. In one example, as shown in FIG. 2, during operation, wearable display device 110 may be employed in conjunction with both processing device 120 and wearable power device 140, where wearable power device 140 provides additional operating power to wearable display device 110 and/or charges battery 114 over a wired or wireless power connection 204 (e.g., via power interfaces 118 and 148). In addition, wearable power device 140 may employ a wired or wireless data connection 206 to transfer data (e.g., data indicating an amount of charge remaining in battery 144) between wearable power device 140 and wearable display device 110. Additionally, in some embodiments, wearable power device 140 may incorporate some or all of the functionality of processing device 120, thus potentially negating the need for processing device 120 in some cases. In yet other embodiments, configuration 200 may not include the use of wearable power device 140. In further examples, wearable power device 140, by way of wired or wireless power connection 204, may charge wearable display device 110 at times during which wearable power device 140 is not being worn and operated as part of system 100 by the user.

Figure 3:
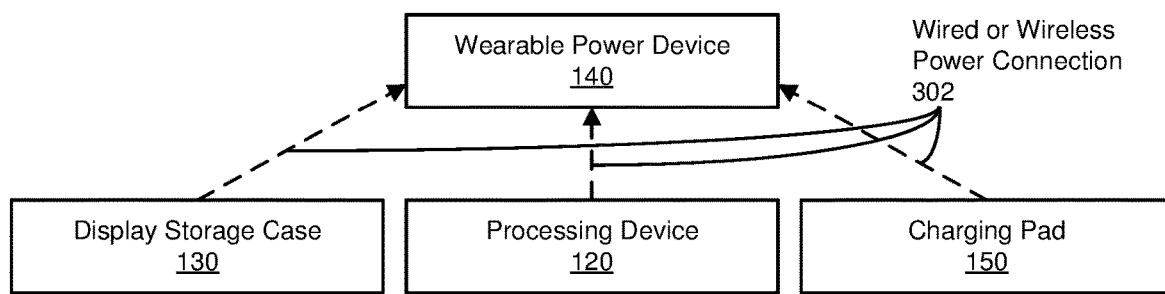

FIG. 3 is a block diagram of a configuration 300 in which battery 144 of wearable power device 140 may be charged from time to time by display storage case 130, processing device 120, and/or charging pad 150 by way of a wired or wireless power connection 302, such as by way of a wired connection (e.g., a USB® or more general wired connection) or an inductively-coupled wireless connection. Such charging, as indicated in FIG. 3, may occur in tandem with other charging configurations described hereinafter. Moreover, in some examples, one or more of processing device 120, display storage case 130, and/or charging pad 150 may receive power from a power outlet (e.g., a 120-volt (V) household outlet), a USB® connection, or other electrical power connection.

Figure 4:
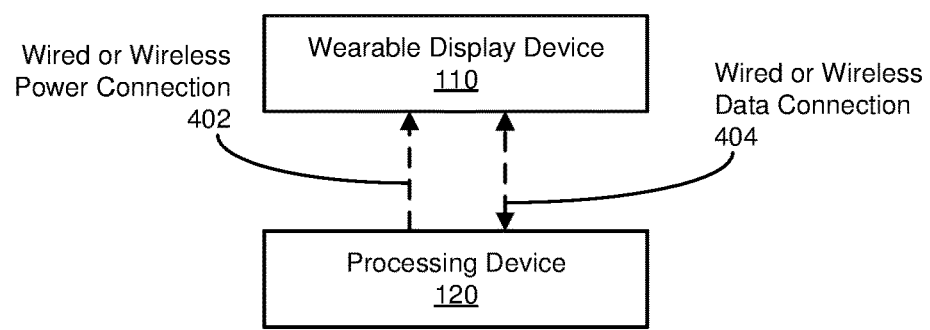

FIG. 4 is a block diagram of a configuration 400 in which processing device 120 may charge battery 114 of wearable display device 110 outside of normal operation via a wired or wireless power connection 402 (e.g., via power interfaces 118 and 128). For example, in the wireless case, processing device 120 may include an inductive charging coil or similar component such that, when wearable display device 110 is placed atop processing device 120, processing device 120 may charge battery 114 of wearable display device 110. Additionally, during that same time, processing device 120 and wearable display device 110 may be communicatively coupled via wired or wireless data connection 404 (e.g., via data interfaces 116 and 126). In some examples, processing device 120 may employ data connection 404 to update firmware or perform other offline functions on wearable display device 110.

Figure 5:
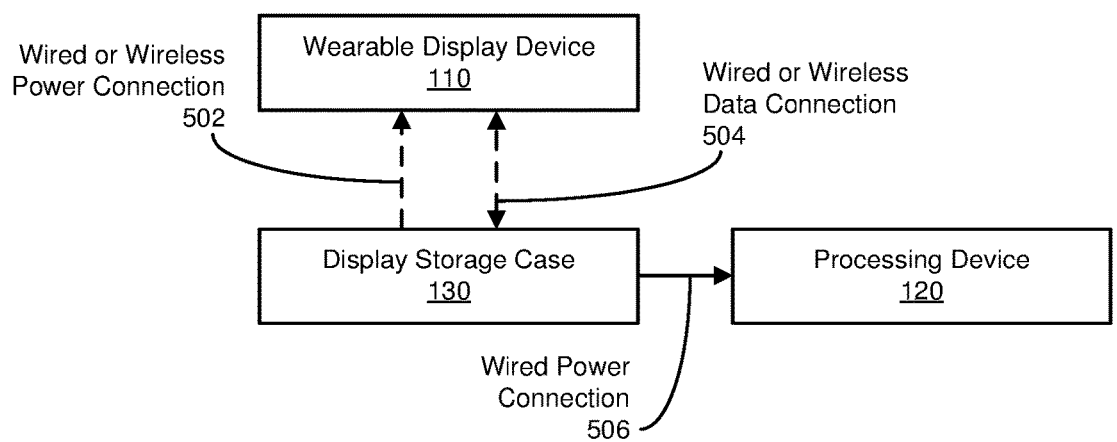

FIG. 5 is a block diagram of a configuration 500 in which display storage case 130 may charge battery 114 of wearable display device 110 outside of normal operation via a wired or wireless power connection 502 (e.g., via power interfaces 118 and 138), as discussed more fully above. In addition, in some embodiments, display storage case 130 may perform one or more maintenance functions, as described above, by way of a wired or wireless data connection 504 (e.g., via data interfaces 116 and 136). Additionally, in some examples, display storage case 130 may charge battery 124 of processing device 120 by way of a wired power connection 506 (e.g., a USB® connection).

Figure 6:
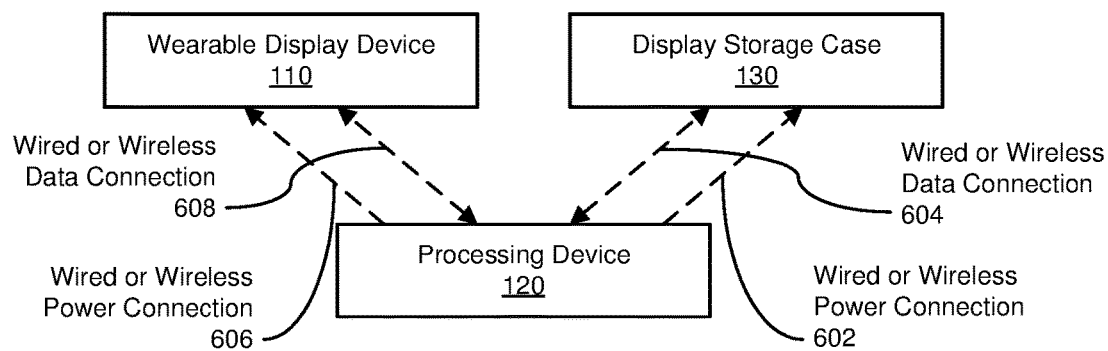

In FIG. 6, as a corollary to configuration 400 of FIG. 4, processing device 120, by way of wired or wireless (e.g., inductive coupling) power connections 602 and 606, may charge display storage case 130 and wearable display device 110 simultaneously (e.g., by way of a sufficiently large charging coil when both wearable display device 110 and display storage case 130 are placed atop processing device 120). Additionally, in some examples, wired or wireless data connection 604 and/or 608 may be used to provide a communication link with display storage case 130 and/or wearable display device 110, respectively, such as for maintenance purposes, as discussed above.

Figure 7:
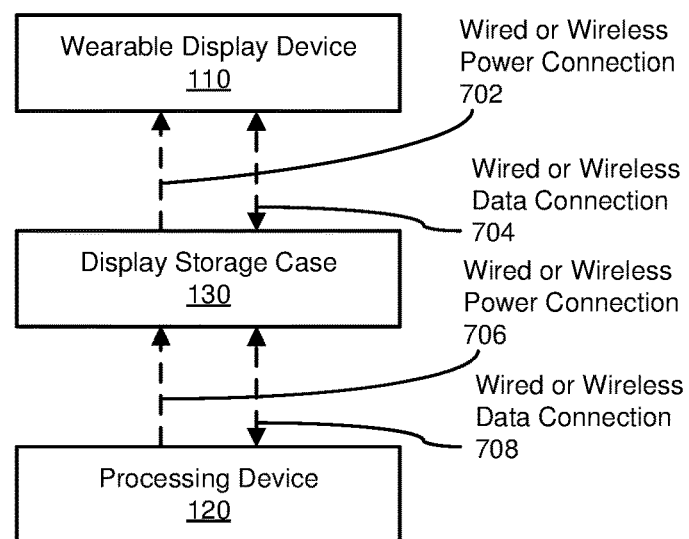

Instead of charging wearable display device 110 and display storage case 130 in parallel, as shown in FIG. 6, processing device 120, in some examples, may charge wearable display device 110 and display storage case 130 in a stacked configuration, as indicated in FIG. 7. More specifically, processing device 120, by way of a wired or wireless power connection 706, may charge battery 134 of display storage case 130. In turn, display storage case 130 may charge battery 114 of wearable display device 110 simultaneously (e.g., when wearable display device 110 rests within display storage case 130) via a wired or wireless power connection 702, using either battery 134 or the electrical energy being received over wired data connection 708. Similarly, processing device 120 may communicate with display storage case 130 or wearable display device 110 by way of wired or wireless data connection 708. In turn, display storage case 130 may operate as an intermediate party to transfer communications between processing device 120 and wearable display device 110 using wired or wireless data connection 704, such as for maintenance (e.g., optical alignment, firmware upgrade, and the like) of wearable display device 110.

Figure 8:
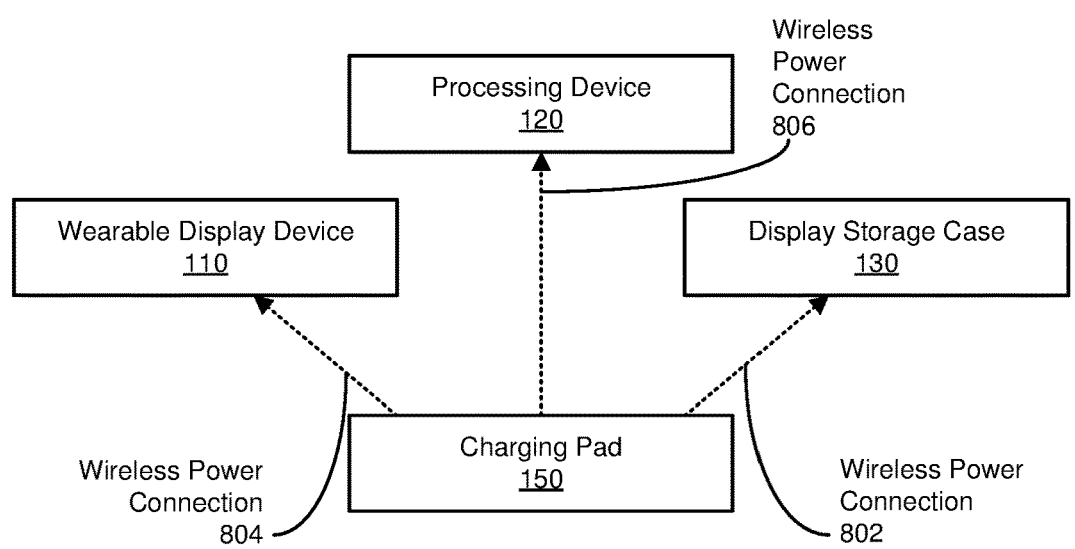

FIG. 8 is a block diagram of a configuration 800 in which charging pad 150 may wirelessly charge (e.g., via inductive charging) one or more of wearable display device 110, processing device 120, and display storage case 130 simultaneously via wireless power connection 804, 806, and 802, respectively. In such examples, charging pad 150 may include a charging surface large enough that two or more of devices 110, 120, and 130 may be placed atop charging pad 150 simultaneously.

Figure 9:
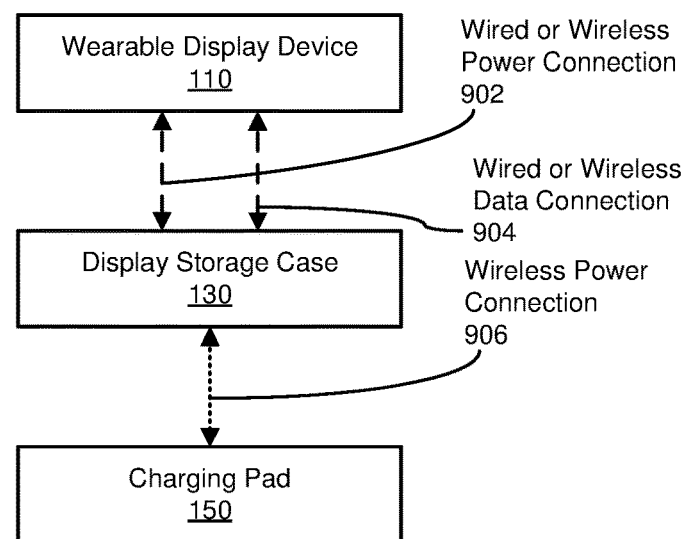
Figure 10:
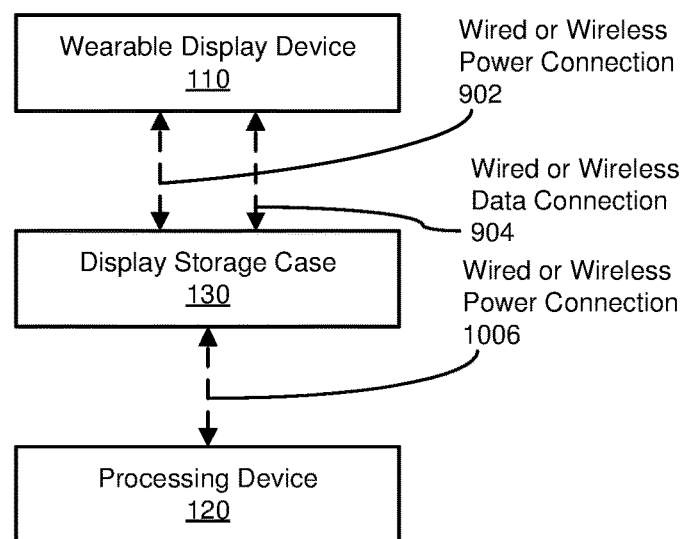

In a related stacked configuration, as illustrated in FIG. 9, charging pad 150 may inductively charge and/or provide operating power for display storage case 130 via wireless power connection 906. Simultaneously, display storage case 130 may charge battery 114 of wearable display device 110 by way of a wired or wireless power connection 902 (e.g., using electrical energy stored in battery 134 or transferred from wireless power connection 906), as well as communicate with wearable display device 110 by way of wired or wireless data connection 904 for one or more maintenance purposes. In other embodiments, such as that depicted in the block diagram of FIG. 10, processing device 120 may be employed instead of charging pad 150 to charge or provide power for display storage case 130 by way of wired or wireless power connection 1006. Simultaneously, display storage case 130 may be coupled with wearable display device 110 via power connection 902 and/or data connection 904, as described above.

Figure 11:
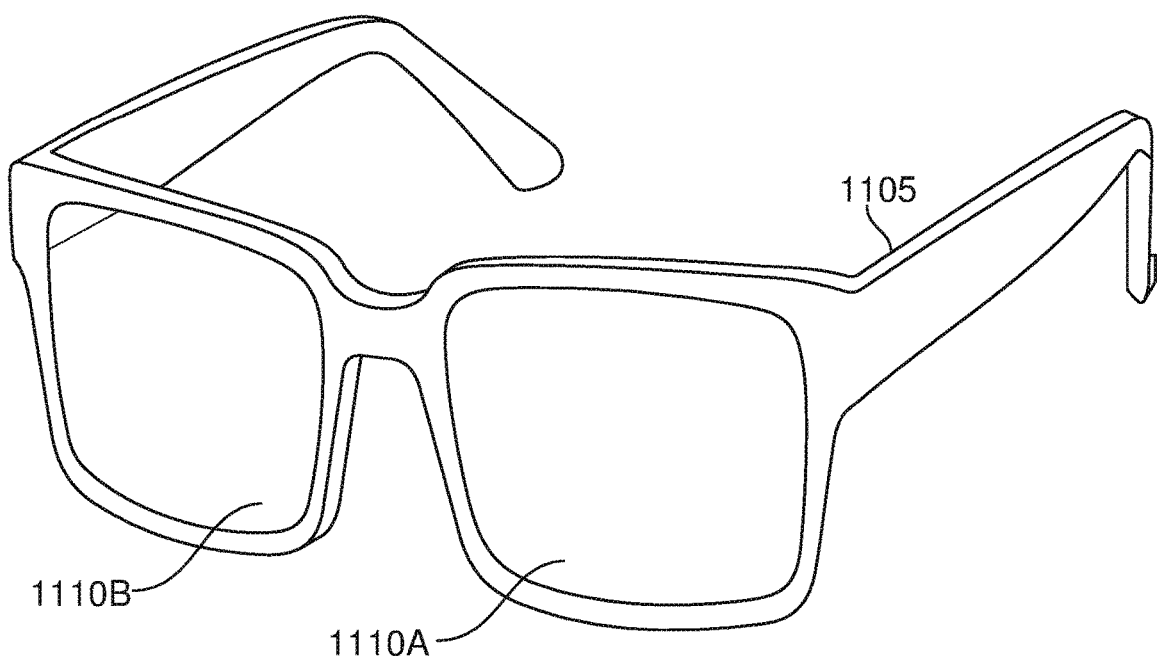
FIG. 11 is a perspective diagram of an exemplary near-eye display (NED) employable as a wearable display device of the system of FIG. 1.

FIG. 11 is a perspective diagram of an exemplary NED 1100 that may serve as wearable display device 110 of FIG. 1. The depicted embodiment includes a left display 1110A and a right display 1110B (e.g., included in display subsystem 112), which may present visual images to a left eye and a right eye, respectively, of the user. In some embodiments, NED 1100 may also present audio to a user, such as via speakers and/or headphones (not shown in FIG. 11). In some examples, NED 1100 may operate as an AR NED, such that a user can see media projected by NED 1100 as well as the real-world environment through NED 1100. However, in some embodiments, NED 1100 may operate as a VR NED, an MR NED, or some combination thereof. Accordingly, in some embodiments, NED 1100 may augment views of a physical, real-world environment with computer-generated elements (e.g., images, video, sound, etc.). As illustrated in FIG. 11, NED 1100 may include a support or frame 1105 (e.g., a frame for eyeglasses) that secures NED 1100 in place on the head of the user.

Figure 12:
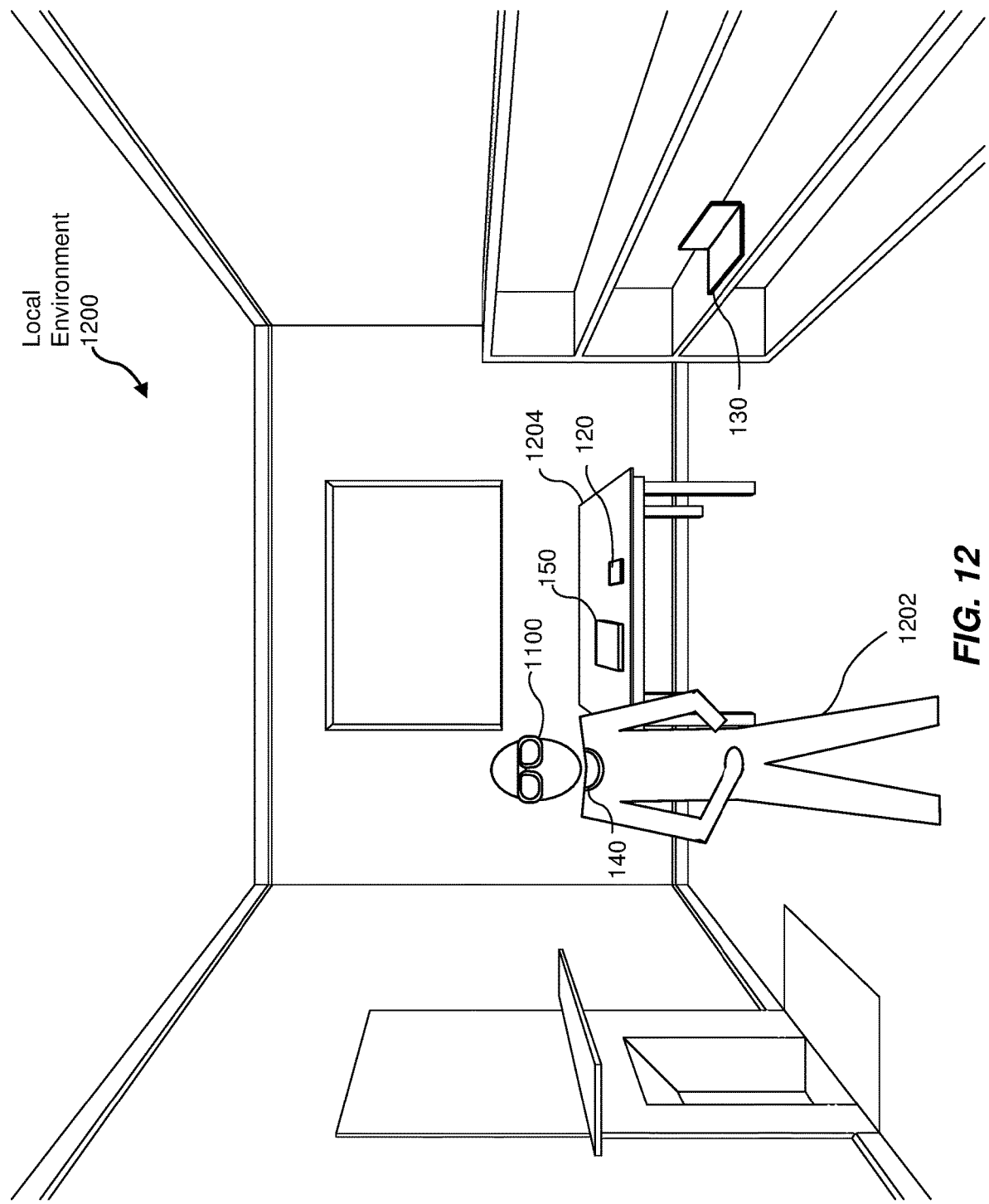
FIG. 12 is a perspective diagram of an exemplary electronic system employable as the system of FIG. 1 that includes the NED of FIG. 11 being operated by a user within a local environment.

FIG. 12 is a perspective diagram of a local environment 1200 in which an example of system 100, including NED 1100 of FIG. 11, may be employed. More specifically, local environment 1200 may be a room in which a user 1202 wears NED 1100 as part of artificial reality system 100. Additional devices of system 100 employed in conjunction with NED 1100 (e.g., serving as an example of wearable display device 110) that are also depicted in FIG. 12 include processing device 120 (shown in FIG. 12 to be the approximate size and shape of a smartphone), display storage case 130, wearable power device 140, and charging pad 150. As mentioned above, processing device 120 may be located on a stable surface (e.g., a table 1204 located near user 1202), and may include display data processing subsystem 122 to generate image data that is then transmitted (e.g., in the configuration of FIG. 12, transmitted wirelessly) to NED 1100 for presentation to the eyes of user 1202. Processing device 120 may also include position/orientation subsystem 123, which may include one or more cameras and/or other components that may detect portions of user 1202 and/or areas of local environment 1200, such as the walls, ceiling, and/or floor of the room, as well as various objects within the room, such as table 1204, a bookcase, a fireplace mantel, and so on.

In some examples, user 1202 may employ processing device 120 as an input device, such as by manipulating input buttons or touching a touchscreen (not shown in FIG. 12) provided on processing device 120. In other embodiments, user 1202 may hold processing device 120 and move processing device 120 about. In such examples, NED 1100 may include one or more cameras or other detection components that detect a location and/or orientation of processing device 120 (e.g., by way of tracking IR-emitting LEDs on processing device 120). NED 1100 may then forward data indicating that location and/or orientation to processing device 120, which may utilize that data as input to system 100 (e.g., by generating image data for NED 1100 based at least in part on that data).

Also illustrated in FIG. 12 is wearable power device 140, which may include a battery for supplying power to either operate NED 1100 or charging a battery residing within NED 1100, as discussed more fully above. In this particular example, wearable power device 140 is depicted as a necklace, although other wearable formats (e.g., a lanyard or belt) may also be used.

Shown on a bookcase shelf of local environment 1200 is an example of display storage case 130, which in this embodiment is a hinged case into which NED 1100 may be placed, after which display storage case 130 may be closed, thus completely enveloping NED 1100. However, in other examples, display storage case 130 need not be hinged or be capable of closing about NED 1100 to accomplish the various possible charging and/or maintenance operations described above.

Also depicted as residing on table 1204 is an example of charging pad 150 (e.g., a charging pad that employs inductive coupling, such as via or one or more coils, possibly according to the Qi® wireless charging standard). In some examples, any of NED 1100, processing device 120, display storage case 130, or wearable power device 140 may be placed atop charging pad 150 to charge a battery residing therein as part of a charging configuration, as described above. In some examples, more than one such device 1100, 120, 130, or 140 may be charged simultaneously, depending on the charging surface area of charging pad 150.

As explained above in conjunction with FIGS. 1 through 12, multi-device electronic systems may facilitate the distribution of functionality for the system in such a manner that one or more of the devices (e.g., one or more wearable devices) may be rendered smaller and/or lighter than what otherwise would be possible, thus potentially facilitating ease of use and greater user satisfaction. Additionally, the multiple devices may allow multiple system configurations by which data and/or power may be routed or transferred, such as to facilitate normal operation, energy storage, maintenance, and other system functionality.

One or more of the devices of system 100 may include any type or form of computing or processing device or system capable of executing computer-readable instructions. In their most basic configuration, these computing or processing device(s) may each include at least one memory device and at least one physical processor. In certain embodiments, the computer-readable instructions mentioned above may represent one or more software applications or programs that, when executed by a computing or processing device, may cause the computing or processing device to perform one or more tasks.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

As indicated above, embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 1300 in FIG. 13. Other artificial reality systems may include an NED that also provides visibility into the real world (e.g., AR system 1400 in FIG. 14) or that visually immerses a user in an artificial reality (e.g., VR system 1500 in FIG. 15). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 13:
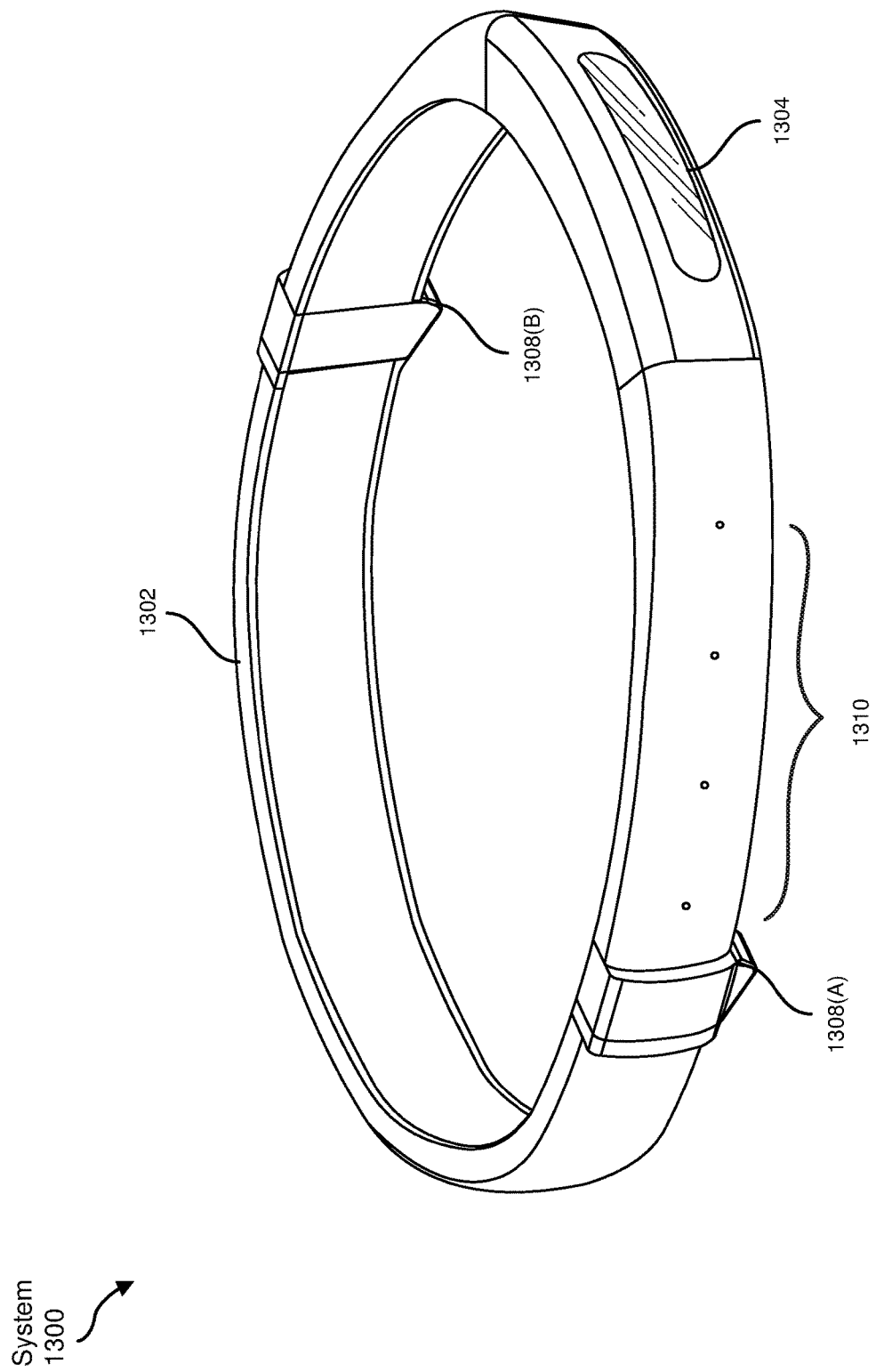
FIG. 13 is a perspective view of an exemplary augmented reality system that may employ various methods disclosed herein.

Turning to FIG. 13, AR system 1300 generally represents a wearable device dimensioned to fit about a body part (e.g., a head) of a user. As shown in FIG. 13, system 1300 may include a frame 1302 and a camera assembly 1304 that is coupled to frame 1302 and configured to gather information about a local environment by observing the local environment. AR system 1300 may also include one or more audio devices, such as output audio transducers 1308(A) and 1308(B) and input audio transducers 1310. Output audio transducers 1308(A) and 1308(B) may provide audio feedback and/or content to a user, and input audio transducers 1310 may capture audio in a user's environment.

As shown, AR system 1300 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 1300 may not include an NED, AR system 1300 may include other types of screens or visual feedback devices (e.g., a display screen integrated into a side of frame 1302).

Figure 14:
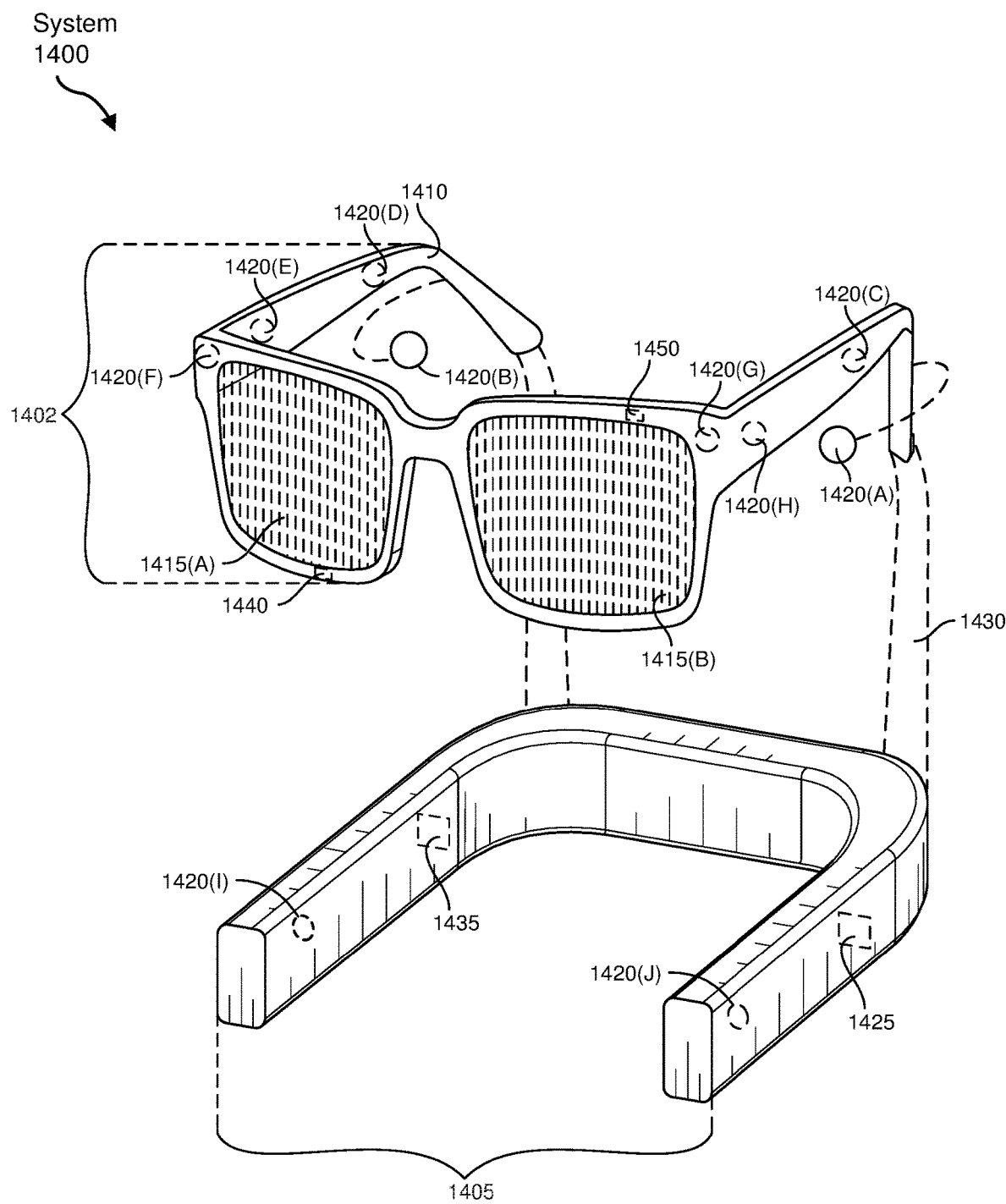
FIG. 14 is a perspective view of another exemplary augment reality system that may employ various methods disclosed herein.

The embodiments discussed in this disclosure may also be implemented in AR systems that include one or more NEDs. For example, as shown in FIG. 14, AR system 1400 may include an eyewear device 1402 with a frame 1410 configured to hold a left display device 1415(A) and a right display device 1415(B) in front of a user's eyes. Display devices 1415(A) and 1415(B) may act together or independently to present an image or series of images to a user. While AR system 1400 includes two displays, embodiments of this disclosure may be implemented in AR systems with a single NED or more than two NEDs.

In some embodiments, AR system 1400 may include one or more sensors, such as sensor 1440. Sensor 1440 may generate measurement signals in response to motion of AR system 1400 and may be located on substantially any portion of frame 1410. Sensor 1440 may include a position sensor, an inertial measurement unit (IMU), a depth camera assembly, or any combination thereof. In some embodiments, AR system 1400 may or may not include sensor 1440 or may include more than one sensor. In embodiments in which sensor 1440 includes an IMU, the IMU may generate calibration data based on measurement signals from sensor 1440. Examples of sensor 1440 may include, without limitation, accelerometers, gyroscopes, magnetometers, other suitable types of sensors that detect motion, sensors used for error correction of the IMU, or some combination thereof.

AR system 1400 may also include a microphone array with a plurality of acoustic sensors 1420(A)-1420(J), referred to collectively as acoustic sensors 1420. Acoustic sensors 1420 may be transducers that detect air pressure variations induced by sound waves. Each acoustic sensor 1420 may be configured to detect sound and convert the detected sound into an electronic format (e.g., an analog or digital format). The microphone array in FIG. 14 may include, for example, ten acoustic sensors: 1420(A) and 1420(B), which may be designed to be placed inside a corresponding ear of the user, acoustic sensors 1420(C), 1420(D), 1420(E), 1420(F), 1420(G), and 1420(H), which may be positioned at various locations on frame 1410, and/or acoustic sensors 1420(I) and 1420(J), which may be positioned on a corresponding neckband 1405.

The configuration of acoustic sensors 1420 of the microphone array may vary. While AR system 1400 is shown in FIG. 14 as having ten acoustic sensors 1420, the number of acoustic sensors 1420 may be greater or less than ten. In some embodiments, using higher numbers of acoustic sensors 1420 may increase the amount of audio information collected and/or the sensitivity and accuracy of the audio information. In contrast, using a lower number of acoustic sensors 1420 may decrease the computing power required by the controller 1450 to process the collected audio information. In addition, the position of each acoustic sensor 1420 of the microphone array may vary. For example, the position of an acoustic sensor 1420 may include a defined position on the user, a defined coordinate on the frame 1410, an orientation associated with each acoustic sensor, or some combination thereof.

Acoustic sensors 1420(A) and 1420(B) may be positioned on different parts of the user's ear, such as behind the pinna or within the auricle or fossa. Or, there may be additional acoustic sensors on or surrounding the ear in addition to acoustic sensors 1420 inside the ear canal. Having an acoustic sensor positioned next to an ear canal of a user may enable the microphone array to collect information on how sounds arrive at the ear canal. By positioning at least two of acoustic sensors 1420 on either side of a user's head (e.g., as binaural microphones), AR device 1400 may simulate binaural hearing and capture a 3D stereo sound field around about a user's head. In some embodiments, acoustic sensors 1420(A) and 1420(B) may be connected to AR system 1400 via a wired connection, and in other embodiments, the acoustic sensors 1420(A) and 1420(B) may be connected to AR system 1400 via a wireless connection (e.g., a Bluetooth connection). In still other embodiments, acoustic sensors 1420(A) and 1420(B) may not be used at all in conjunction with AR system 1400.

Acoustic sensors 1420 on frame 1410 may be positioned along the length of the temples, across the bridge, above or below display devices 1415(A) and 1415(B), or some combination thereof. Acoustic sensors 1420 may be oriented such that the microphone array is able to detect sounds in a wide range of directions surrounding the user wearing the AR system 1400. In some embodiments, an optimization process may be performed during manufacturing of AR system 1400 to determine relative positioning of each acoustic sensor 1420 in the microphone array.

AR system 1400 may further include or be connected to an external device (e.g., a paired device), such as neckband 1405. As shown, neckband 1405 may be coupled to eyewear device 1402 via one or more connectors 1430. Connectors 1430 may be wired or wireless connectors and may include electrical and/or non-electrical (e.g., structural) components. In some cases, eyewear device 1402 and neckband 1405 may operate independently without any wired or wireless connection between them. While FIG. 14 illustrates the components of eyewear device 1402 and neckband 1405 in example locations on eyewear device 1402 and neckband 1405, the components may be located elsewhere and/or distributed differently on eyewear device 1402 and/or neckband 1405. In some embodiments, the components of eyewear device 1402 and neckband 1405 may be located on one or more additional peripheral devices paired with eyewear device 1402, neckband 1405, or some combination thereof. Furthermore, neckband 1405 generally represents any type or form of paired device. Thus, the following discussion of neckband 1405 may also apply to various other paired devices, such as smart watches, smart phones, wrist bands, other wearable devices, hand-held controllers, tablet computers, laptop computers, etc.

Pairing external devices, such as neckband 1405, with AR eyewear devices may enable the eyewear devices to achieve the form factor of a pair of glasses while still providing sufficient battery and computation power for expanded capabilities. Some or all of the battery power, computational resources, and/or additional features of AR system 1400 may be provided by a paired device or shared between a paired device and an eyewear device, thus reducing the weight, heat profile, and form factor of the eyewear device overall while still retaining desired functionality. For example, neckband 1405 may allow components that would otherwise be included on an eyewear device to be included in neckband 1405 since users may tolerate a heavier weight load on their shoulders than they would tolerate on their heads. Neckband 1405 may also have a larger surface area over which to diffuse and disperse heat to the ambient environment. Thus, neckband 1405 may allow for greater battery and computation capacity than might otherwise have been possible on a stand-alone eyewear device. Since weight carried in neckband 1405 may be less invasive to a user than weight carried in eyewear device 1402, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

Neckband 1405 may be communicatively coupled with eyewear device 1402 and/or to other devices. The other devices may provide certain functions (e.g., tracking, localizing, depth mapping, processing, storage, etc.) to AR system 1400. In the embodiment of FIG. 14, neckband 1405 may include two acoustic sensors (e.g., 1420(I) and 1420(J)) that are part of the microphone array (or potentially form their own microphone subarray). Neckband 1405 may also include a controller 1425 and a power source 1435.

Acoustic sensors 1420(I) and 1420(J) of neckband 1405 may be configured to detect sound and convert the detected sound into an electronic format (analog or digital). In the embodiment of FIG. 14, acoustic sensors 1420(I) and 1420 (J) may be positioned on neckband 1405, thereby increasing the distance between the neckband acoustic sensors 1420(I) and 1420(J) and other acoustic sensors 1420 positioned on eyewear device 1402. In some cases, increasing the distance between acoustic sensors 1420 of the microphone array may improve the accuracy of beamforming performed via the microphone array. For example, if a sound is detected by acoustic sensors 1420(C) and 1420(D) and the distance between acoustic sensors 1420(C) and 1420(D) is greater than, e.g., the distance between acoustic sensors 1420(D) and 1420(E), the determined source location of the detected sound may be more accurate than if the sound had been detected by acoustic sensors 1420(D) and 1420(E).

Controller 1425 of neckband 1405 may process information generated by the sensors on neckband 1405 and/or AR system 1400. For example, controller 1425 may process information from the microphone array that describes sounds detected by the microphone array. For each detected sound, controller 1425 may perform a DoA estimation to estimate a direction from which the detected sound arrived at the microphone array. As the microphone array detects sounds, controller 1425 may populate an audio data set with the information. In embodiments in which AR system 1400 includes an inertial measurement unit, controller 1425 may compute all inertial and spatial calculations from the IMU located on eyewear device 1402. Connector 1430 may convey information between AR system 1400 and neckband 1405 and between AR system 1400 and controller 1425. The information may be in the form of optical data, electrical data, wireless data, or any other transmittable data form. Moving the processing of information generated by AR system 1400 to neckband 1405 may reduce weight and heat in eyewear device 1402, making it more comfortable to the user.

Power source 1435 in neckband 1405 may provide power to eyewear device 1402 and/or to neckband 1405. Power source 1435 may include, without limitation, lithium ion batteries, lithium-polymer batteries, primary lithium batteries, alkaline batteries, or any other form of power storage. In some cases, power source 1435 may be a wired power source. Including power source 1435 on neckband 1405 instead of on eyewear device 1402 may help better distribute the weight and heat generated by power source 1435.

As noted, some artificial reality systems may, instead of blending an artificial reality with actual reality, substantially replace one or more of a user's sensory perceptions of the real world with a virtual experience. One example of this type of system is a head-worn display system, such as VR system 1500 in FIG. 15, that mostly or completely covers a user's field of view. VR system 1500 may include a front rigid body 1502 and a band 1504 shaped to fit around a user's head. VR system 1500 may also include output audio transducers 1506(A) and 1506(B). Furthermore, while not shown in FIG. 15, front rigid body 1502 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 1400 and/or VR system 1500 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 1400 and/or VR system 1500 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 1300, AR system 1400, and/or VR system 1500 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 13 and 15, output audio transducers 1308 (A), 1308(B), 1506(A), and 1506(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1310 may include condenser microphones, dynamic microphones, ribbon microphones, and/or any other type or form of input transducer. In some embodiments, a single transducer may be used for both audio input and audio output.

Figure 15:
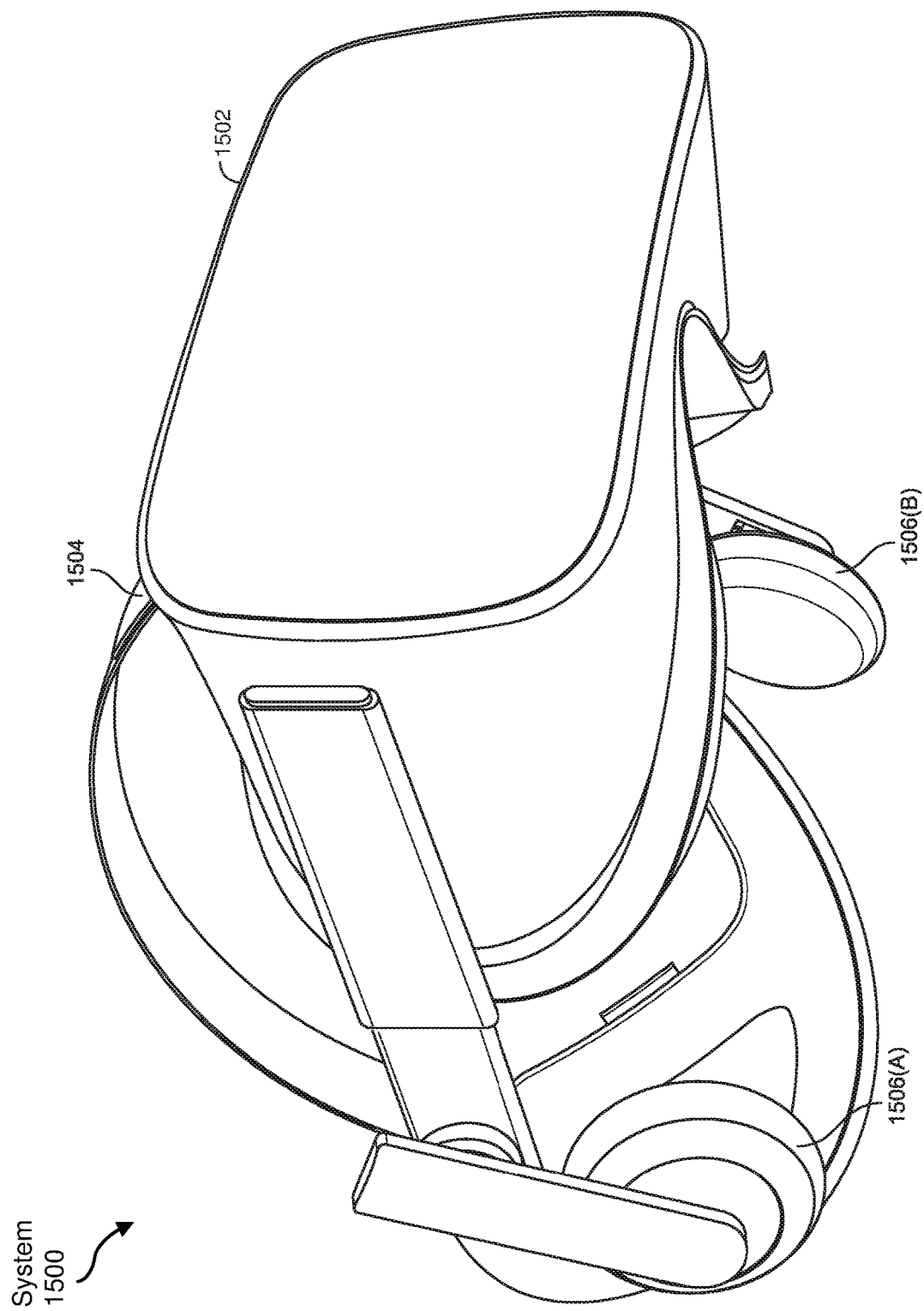
FIG. 15 is a perspective view of an exemplary virtual reality system that may employ various methods disclosed herein.

While not shown in FIGS. 13-15, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Some AR systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 1300, 1400, and 1500 of FIGS. 13-15, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An artificial reality system comprising:
   a wearable display device to be worn by a user while the artificial reality system is in an operational configuration, the wearable display device comprising:
   a display subsystem that presents an image to the user;
   at least one light sensor; and
   a first wireless communication interface that receives image data, wherein the display subsystem bases the image on the image data; and
   a processing device that is physically separate from the wearable display device in the operational configuration, wherein the processing device comprises:
   a display data processing subsystem that generates the image data;
   at least one light-emitting component;
   a second wireless communication interface that transmits the image data directly to the first wireless communication interface of the wearable display device; and
   a position detection subsystem comprising at least one position sensor, wherein:

the at least one position sensor captures depth data in a local environment of the wearable display device;

the position detection subsystem determines at least one of a location or an orientation of at least a portion of the user within the local environment; and the display data processing subsystem generates the image data based at least in part on the at least one of the location or the orientation of the portion of the user within the local environment;

wherein:

the at least one light sensor detects light from the at least one light-emitting component;

the first wireless communication interface transmits data indicating the light detected by the at least one light sensor to the second wireless communication interface of the processing device;

the position detection subsystem determines a location of the at least one light-emitting component based on the data; and the display data processing subsystem interprets the location of the at least one light-emitting component as a location of the processing device being employed as a user input device, wherein the image data is further based on the location of the at least one light-emitting component within the local environment.

2. The artificial reality system of claim 1, wherein the at least one position sensor comprises at least one camera.

3. The artificial reality system of claim 1, wherein the portion of the user comprises at least one of a head, a face, hands, arms, or legs of the user.

4. The artificial reality system of claim 1, wherein:

the position detection subsystem generates a map of the local environment based on the depth data; and the display data processing subsystem generates the image data based at least in part on the map of the local environment.

5. The artificial reality system of claim 4, wherein the display data processing subsystem generates the image data based at least in part on the map of the local environment by generating an artificial environment represented in at least a portion of the image data.

6. The artificial reality system of claim 1, wherein the second wireless communication interface transmits the at least one of the location or the orientation of the portion of the user within the local environment to a second artificial reality system.

7. The artificial reality system of claim 1, wherein the display data processing subsystem generates a three-dimensional model of the user based on the at least one of the location or the orientation of the portion of the user within the local environment.

8. The artificial reality system of claim 7, wherein the display data processing subsystem generates the image data based at least in part on the three-dimensional model.

9. The artificial reality system of claim 8, wherein the second wireless communication interface transmits the three-dimensional model to a second artificial reality system.

10. The artificial reality system of claim 1, wherein:

the second wireless communication interface receives at least one of a location or an orientation of at least a portion of a user of a second artificial reality system in relation to a local environment of the second artificial reality system; and the image data is based at least in part on the location or the orientation of the user of the second artificial reality system.

11. The artificial reality system of claim 1, wherein the display data processing subsystem interprets the location of the at least one light-emitting component as a location of the processing device being employed as a handheld user input device.

12. The artificial reality system of claim 1, wherein:

the wearable display device comprises:

a first battery that supplies power to operate the wearable display device; and a first power interface that receives power to charge the first battery;

the processing device comprises:

a second battery that supplies power to operate the processing device; and a second power interface that transmits power from the second battery to the first power interface of the wearable display device to charge the first battery while the artificial reality system is in a charging configuration.

13. The artificial reality system of claim 12, wherein an energy storage capacity of the second battery is greater than an energy storage capacity of the first battery.

14. The artificial reality system of claim 12, wherein the first power interface and the second power interface are wireless power interfaces that are inductively coupled to each other while the artificial reality system is in the charging configuration in which the wearable display device resides atop the processing device.

15. The artificial reality system of claim 1, wherein:

the processing device comprises an input interface that generates input data in response to an action by the user; and the display data processing subsystem generates the image data based at least in part on the input data.

16. The artificial reality system of claim 15, wherein the input interface comprises at least one of a click interface and a touch interface.

17. A wearable display device for an artificial reality system, the wearable display device comprising:

a display subsystem that presents an image to a user while the artificial reality system is in an operational configuration;

at least one light sensor that detects light from at least one light-emitting component of a processing device that is physically separate from the wearable display device while the artificial reality system is in the operational configuration; and a wireless communication interface that:

transmits data indicating the light detected by the at least one light sensor to the processing device; and receives image data from the processing device, wherein the image data is based on a determined location of the processing device being employed as a user input device, as indicated by the light detected by the at least one light sensor, and wherein the display subsystem bases the image on the image data.

18. A processing device for an artificial reality system, the processing device comprising:

a display data processing subsystem that generates image data;

at least one light-emitting component;

a wireless communication interface that:

transmits the image data directly to a wearable display device that is physically separate from the wearable display device while the artificial reality system is in an operational configuration; and receives data from the wearable display device indicating light emitted by the at least one light-emitting component that is detected by the wearable display device; and a position detection subsystem comprising at least position one sensor, wherein:

the at least one position sensor captures depth data in a local environment of the wearable display device; and the position detection subsystem determines at least one of a location or an orientation of at least a portion of a user of the artificial reality system within the local environment, and determines a location of the at least one light-emitting component based on the data indicating the light emitted by the at least one light-emitting component; and wherein the display data processing subsystem interprets the location of the at least one light-emitting component as a location of the processing device being employed as a user input device, and generates the image data based at least in part on the at least one of the location or the orientation of the portion of the user within the local environment and the location of the at least one light-emitting component.

19. The processing device of claim 18, further comprising:

a battery for supplying power to the processing device; and a wireless power interface that provides power to charge a battery of the wearable display device while the artificial reality system is in a charging configuration in which the wearable display device resides atop the processing device.

20. The wearable display device of claim 17, further comprising:

a battery for supplying power to the wearable display device; and a wireless power interface that receives power by way of inductive coupling with the processing device to charge the battery while the artificial reality system is in a charging configuration in which the wearable display device resides atop the processing device.

* * * * *